United States Patent [19]
Krieger

[11] Patent Number: 4,999,104
[45] Date of Patent: Mar. 12, 1991

[54] DISK-TYPE DECKER

[75] Inventor: Uwe Krieger, Düren, Fed. Rep. of Germany

[73] Assignees: Andreas Kufferath GmbH & Co.; Andreas-Kufferath-Platz, both of Düren-Mariaweiler, Fed. Rep. of Germany

[21] Appl. No.: 244,708

[22] Filed: Sep. 15, 1988

[30] Foreign Application Priority Data

Sep. 16, 1987 [DE] Fed. Rep. of Germany ....... 3730990

[51] Int. Cl.⁵ .............................................. B01D 33/23
[52] U.S. Cl. ...................................... 210/196; 210/247; 210/327; 210/331; 210/346; 210/397; 210/398; 210/406
[58] Field of Search ................ 210/196, 327, 331, 332, 210/333.01, 333.1, 334, 406, 392, 393, 397, 486, 401, 402, 404, 398, 247, 346

[56] References Cited

U.S. PATENT DOCUMENTS

| | | | |
|---|---|---|---|
| 3,409,134 | 11/1968 | Wallace et al. | 210/334 |
| 3,542,198 | 11/1970 | Borjeson | 210/327 |
| 4,001,119 | 1/1977 | Hunter | 210/404 |
| 4,123,363 | 10/1978 | Koskinen | 210/331 |
| 4,136,028 | 1/1979 | Toivonen | 210/331 |
| 4,138,338 | 2/1979 | Velinsky et al. | 210/327 |
| 4,676,901 | 6/1987 | Ragnegard | 210/486 |
| 4,781,835 | 11/1988 | Bahr et al. | 210/402 |

FOREIGN PATENT DOCUMENTS

| | | |
|---|---|---|
| 3235003 | 3/1984 | Fed. Rep. of Germany . |
| 728886 | 4/1980 | U.S.S.R. ................ 210/327 |

Primary Examiner—Frank Spear
Assistant Examiner—Joseph Drodge
Attorney, Agent, or Firm—Max Fogiel

[57] ABSTRACT

In a disk-type decker that is employed to drain suspensions and that has axially distributed suspension chambers and filtrate chambers that are separated by rotating screen disks and open into a stationary tub, the filtrate chambers are evacuated to increase the throughput of the decker and improve and accelerate drainage. The filtrate chambers are for this purpose divided by radial and axial transverse partitions into individual filtrate-chamber sections distributed along the circumference and sealed off from one another. When the screen disks and hence the filtrate-chamber sections rotate and the sections enter into flow engagement with filtrate outlets at the bottom of the decker, they are simultaneously evacuated, accelerating drainage through the disks. The results are a higher throughput, a lower material density in the filtrate, and lower specific investment costs at the same throughput or material density in the filtrate. The filtrates can be separated because the filtrate outlets are divided along the circumference.

31 Claims, 4 Drawing Sheets

DISK-TYPE DECKER

BACKGROUND OF THE INVENTION

The suspension that is to be deckered in a decker of this type, described in German Exposure 3 235 003, flows through an approach-flow system into separate suspension chambers demarcated by a stationary tub between two disks covered with screening that rotate on shafts and will be called "screen disks" in what follows. The suspension drains through the screening and the deckered pulp is advanced by the rotation of the screen disks to the end opposite the intake. The suspension is drained only due to the hydrostatic pressure difference between the suspension chamber or the solids chamber and the filtrate chamber or clarified-water chamber demarcated by the tub (although otherwise, like the suspension chambers, open to the atmosphere). The level of suspension in the suspension chamber is almost as high as the axis that the shaft rotates on.

Also known are disk-type deckers wherein the filtrate chambers are closed off on the side facing a stationary tub that accommodates the suspension and consist of individual sectors with a continuous circumference that rotate on a shaft. All of the sectors have different channels that rotate along in the shaft and extend into a complicated control head that pressurizes or evacuates the individual sectors as necessary and in accordance with their position. A disk-type decker of this type is complicated, expensive, and unreliable.

The object of the present invention is to provide a disk-type decker of the type recited in the preamble with simple means that will allow it to be operated without any problem with vacuum to improve drainage.

While the invention was being developed, it was determined that the filtrate that occurs in a disk-type decker of the type recited in the preamble comprises what is called a primary filtrate and a clarified filtrate. The primary filtrate is the component that flows through the screening as long as it is not covered with a layer of fibers. The consistency of the primary filtrate is of course especially relatively coarse in suspensions with a high percentage of fines. The clarified filtrate is the component of the clarified water that flows through the resulting fiber layer. The density of the clarified filtrate is accordingly very low. The more unsatisfactorily a suspension drains, the lower the percentage of clarified filtrate. The percentage of clarified filtrate can be increased by increasing the pressure difference because the volume of primary filtrate is affected very little thereby. In addition to improving the percentage of clarified filtrate, this vacuum improves the throughput of the disk-type decker.

SUMMARY OF THE INVENTION

The aforesaid object is accordingly attained in a disk-type decker that is provided with means of exploiting the vacuum that are extraordinarily simple and require only the transverse partitions in the filtrate chamber and the source of vacuum that communicates with the filtrate outlet. The separate sections of the filtrate chamber are open radially and can accordingly be evacuated separately to improve and accelerate draining the suspension. The transverse partitions also distribute the pressure along the circumference of the filtrate chambers, which can be accordingly easily be evacuated below the level of the suspension or liquid, especially with no detrimental effects as the result of added air.

In another development that is appropriate for disk type deckers, several filtrate chambers are distributed axially, each demarcated by two screen disks.

The advantage of a further development is that each section of a filtrate chamber can be small enough to be evacuated to a prescribed extent in the vicinity of the bottom of the tub. Too few transverse partitions entails the problem that the time between complete immersion and the already initiated emergence of the sections of filtrate chamber above the level of the suspension, the time, that is, during which the evacuation is in progress, will be too brief.

Another embodiment allows uniform distribution of the filtrate-chamber sections and outstandingly simple design and distribution of the transverse partitions.

A further embodiment allows sufficient vacuum to become established even with a relatively weak source of vacuum, a riser system for example, because the sealing strips impede or prevent the entry of additional air. The filtrate-chamber sections will always be mutually sealed off at the circumference when the sealing strips rest tight against the tub and away from the bottom or outside the vicinity of the filtrate outlet.

In another embodiment the narrow gaps are in themselves means of attaining sufficient vacuum by means of a source with any power at all. This is all the more true when there is in the filtrate-chamber sections that are adjacent along the circumference and are not evacuated residual filtrate that cannot flow through the narrow gaps rapidly enough, resulting in a liquid seal.

It can be practical to operate the source of vacuum in the intermittently or pulsed. Continuous operation on the other hand is possible as an alternative. This happens when there are so many transverse partitions that the filtrate-chamber sections arrive at or exit from the vicinity of the filtrate outlet, while remaining completely below the level of the suspension. The advantage of continuous operation is that no complicated synchronization of the flow of the product with evacuation is necessary.

The outflow of the filtrate and the establishment of vacuum may be promoted as well as allowing the simultaneous evacuation of at least two adjacent filtrate-chamber sections.

Another embodiment allows for example the separation of the filtrate into a primary filtrate and a clarified filtrate. Since the screen disks are cleaned every time they emerge from the suspension and are accordingly clean when they immerse back into it, primary or turbid filtrate will leave the vicinity of the filtrate outlet that is nearest the circumference, and the clarified filtrate will drop into the next area of the filtrate outlet. This allows separation with no problems.

Additional development allow individual adaptation of the evacuation process to particular operating conditions. The various collection lines for example can be subjected to different vacuums in order to obtain optimal results. Furthermore, uniting several filtrate outlets through one collection line simplifies the overall design.

Further developments represent simple design measures for separating the primary filtrate from the clarified filtrate in accordance with individual requirements. Since the transition from primary filtrate to clarified filtrate is not abrupt, the adjustability of the transverse partition makes it possible to adapt individually to the desired operating results.

Another embodiment is based on the idea that evacuation is significant only in the vicinity of the clarified filtrate because the primary filtrate is hardly affected by vacuum. Evacuation can accordingly be restricted to the vicinity of the clarified filtrate when possible and when not affected by the primary-filtrate outlet section during surfacing, even though it would have no deleterious effect in the vicinity of the primary filtrate.

A further embodiment allows very simple evacuation without a motor-driven suction pump.

A further development addresses various ways of cleaning the screen disks once they emerge from the suspension. Although it is otherwise very common to provide spraying nozzles that point at a right angle toward the screen disks in the vicinity of the filtrate chambers, this is impossible in the present case because of the presence of the transverse partitions.

The disk-type decker in accordance with the invention, although it is simple in design, ensures essentially better throughput and leads to more effective and rapid draining of the suspension along with simple separation into several filtrate components, a primary filtrate and a clarified filtrate for example.

BRIEF DESCRIPTION OF THE DRAWINGS

The invention will now be specified with reference to the drawings, wherein.

DESCRIPTION OF THE PREFERRED EMBODIMENTS

Figure 1:
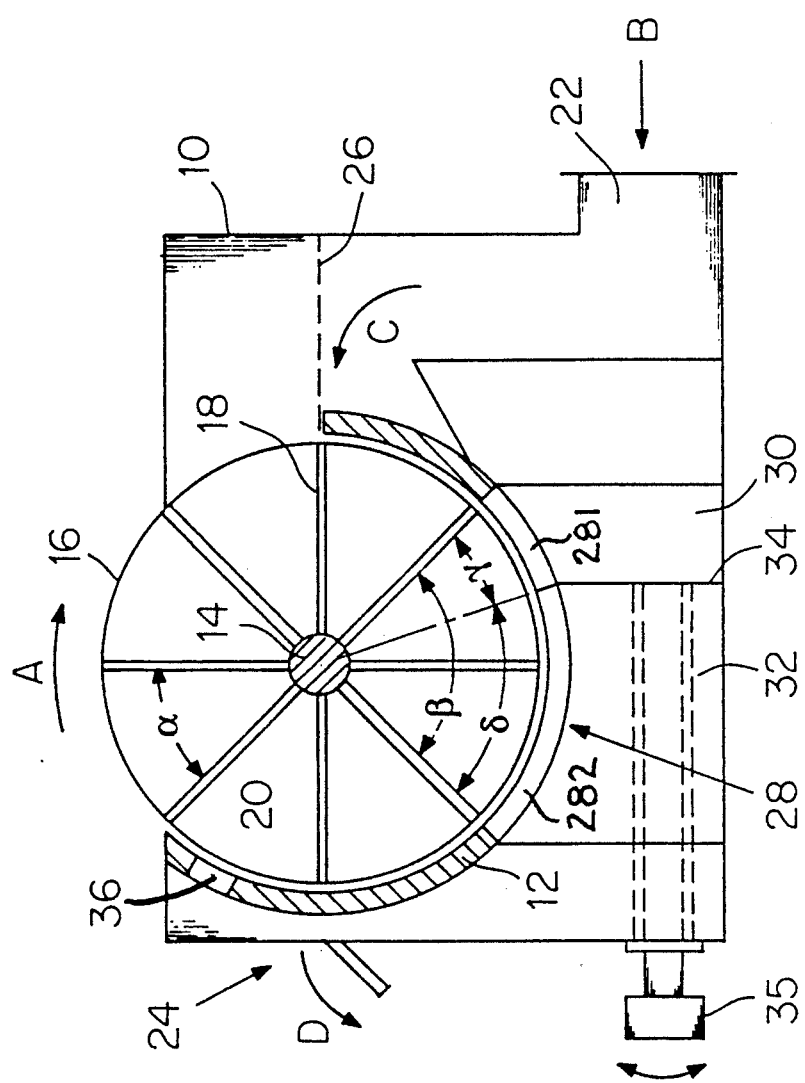
FIG. 1 is a schematic section through one embodiment of a disk-type decker.

The disk-type decker has, as will be evident from the drawings, a housing 10 with a stationary cylindrical tub 12, in which rotates a shaft 14 with several screen disks 16 distributed around it. The disks are sealed off from the tub at their circumference in some way, by means for example of elastic sealing lips 42 that are secured to the disks and extend tightly against the tub or against sealing edges on the tub.

The inside of tub 12 is alternately divided by screen disks 16 and along shaft 14 into suspension chambers 38 which accommodate sealing lips 42, and filtrate chambers 40. The filtrate chambers are divided by radial and axial transverse partitions 18 into separate filtrate-chamber sections 20. Each transverse partition in the present example is secured to shaft 14 and to two screen disks 16. They are in themselves flat, and extend radially out in such a way as to leave only narrow gaps between their outer edges and tub 12 (FIG. 1).

Screen disks 16 can be disks covered with screening. Their function is to drain a suspension that is supplied to suspension chambers 38 by way of a suspension intake 22 and a suspension separator at one end of the disk-type decker. The suspension flows in the direction indicated by arrows B and C, rising to a level 26 (with tub 12 being full more or less to the axis of rotation or to shaft 14), and thence into suspension chambers 38 between draining or screen disks 16. The disks revolve along with shaft 14 in the direction indicated by arrow A, allowing the drained solids to escape from suspension chambers 38 at the opposite end of the disk-type decker through suspension outlets 24 in the direction indicated by arrow D. Below suspension level 26, the suspension drains through screen disks 16, and the resulting filtrate flows out of filtrate chambers 40 or filtrate-chamber sections 20 through a filtrate outlet 28, in the bottom of the tub and divided in the present embodiment into elongated outlet sections 281 and 282, into a collection line 30 that is upstream along the circumference on the one hand, and on the other into another collection line 32 that is downstream along the circumference and separated from upstream collection line 30 by a partition 34. The primary function of upstream collection line 30 is to accommodate the primary or turbid filtrate and that of downstream collection line 32 to accommodate the clarified filtrate. The different filtrate levels are represented hatched.

Figure 2:
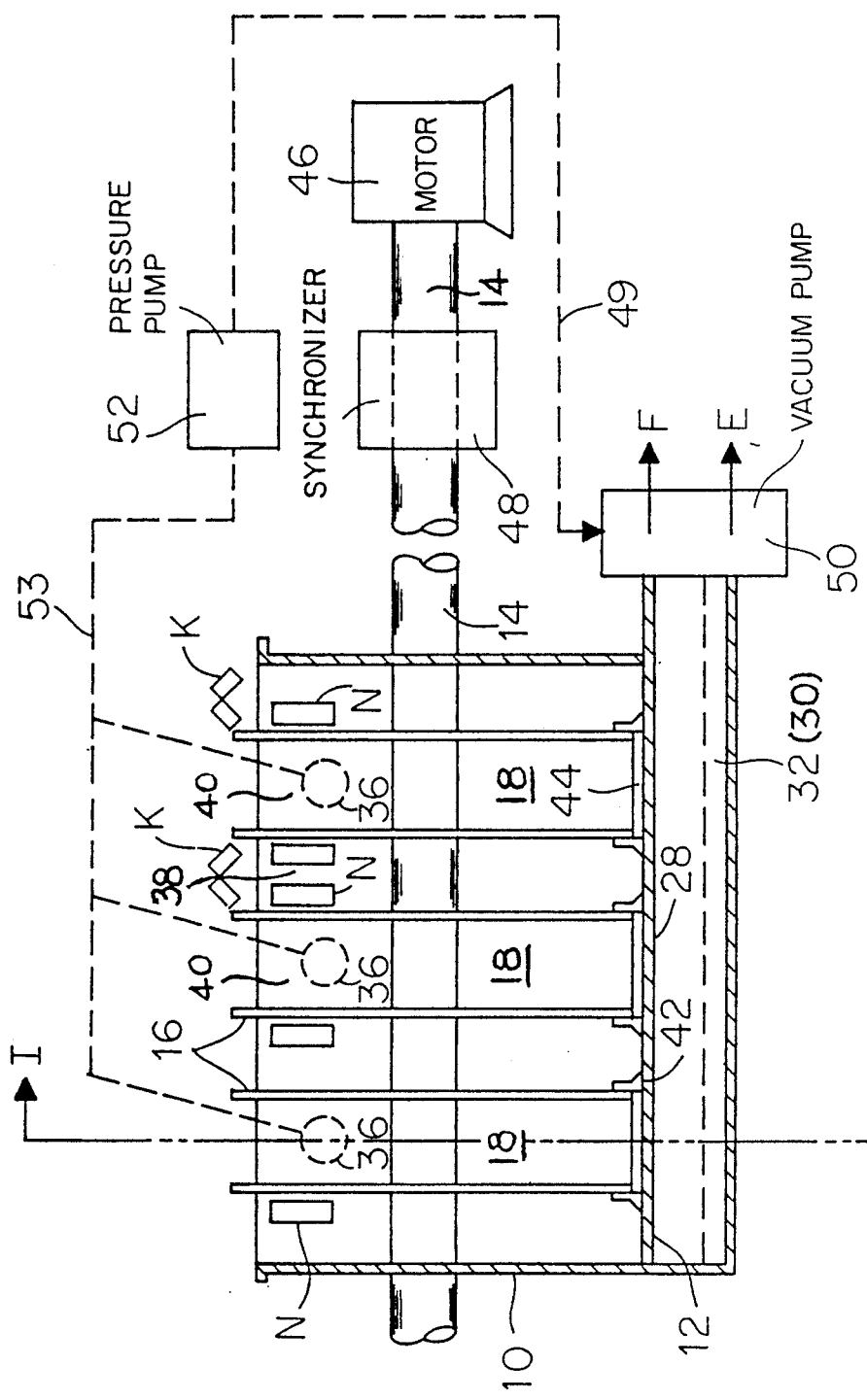
FIG. 2 is a longitudinal section through the disk-type decker illustrated in FIG. 1.

As will be evident from FIG. 2, sealing strips 44, sealing lips for example, extend along the outer edges of transverse partitions 18 and seal off the narrow gap between the partitions and tub 12. Sealing strips 44 can, when they are not in the vicinity of filtrate outlet 28, accordingly seal off the circumference of the filtrate-chamber sections as the sections enter into fluid engagement with filtrate outlet 28. When downstream collection line 32 and/or upstream collection line 30 is evacuated, the vacuum can act by way of filtrate outlet 28 or its sections 281 and 282, in the filtrate-chamber section or sections 20 providing flow communications therewith in such a way as to augment and accelerate draining. FIG. 2 schematically illustrates how the filtrate flows out at the bottom of downstream collection line 32 or upstream collection line 30 in the direction indicated by arrows E and F, whereas a suction occurs above the level of the filtrate and creates a vacuum.

The individual filtrate-chamber sections 20 can be sealed off from one another along the circumference in various ways. On the one hand it is possible to distribute sealing strips 44 along the outer edge of transverse partitions 18. The play or gap between the outer edge of the partitions, on the other hand, will be small enough to prevent the filtrate, that escapes below the evacuated filtrate-chamber sections 20, from flowing down through the gap rapidly. The backed-up filtrate will then function as a seal along the circumference.

Once filtrate-chamber sections 20 emerge above suspension level 26, they can be subjected to a blast of pneumatic pressure from connections 36 in order to release the fibers that settle on screen disks 16 beside suspension chambers 38 even more effectively than by gravity-powered peeling alone, and accordingly clean the disks. For this purpose cylindrical tub 12 extends upward at the end in the vicinity of suspension outlets 24, with the result that any filtrate-chamber section 20 in that location will, as at the bottom of the tub, be at least to some extent sealed off to make it possible to apply the blast of pressure. Instead of or in addition to this means of cleaning the disks, it is also possible to position mechanical scrapers or slanted peeling nozzles K in suspension chambers 38.

If downstream collection line 32 and/or connections 36 are subjected to pulses of vacuum or pressure, it will be necessary to synchronize the process with the rotation of shaft 14. This procedure is illustrated schematically in FIG. 3. A motor 46 rotates shaft 14 and an angle-of-rotation sensor 48 determines its momentary position. The resulting information arrives, through connecting line 49, on the one hand at a source 50 of vacuum (suction pump) that communicates with downstream collection line 32 and/or upstream collection line 30 and on the other hand at a source 52 of pressure that communicates with connections 36. This measure makes it possible to synchronize the function of source 50 of vacuum or 52 of pressure with the operation of the disk-type decker at any time.

Figure 3:
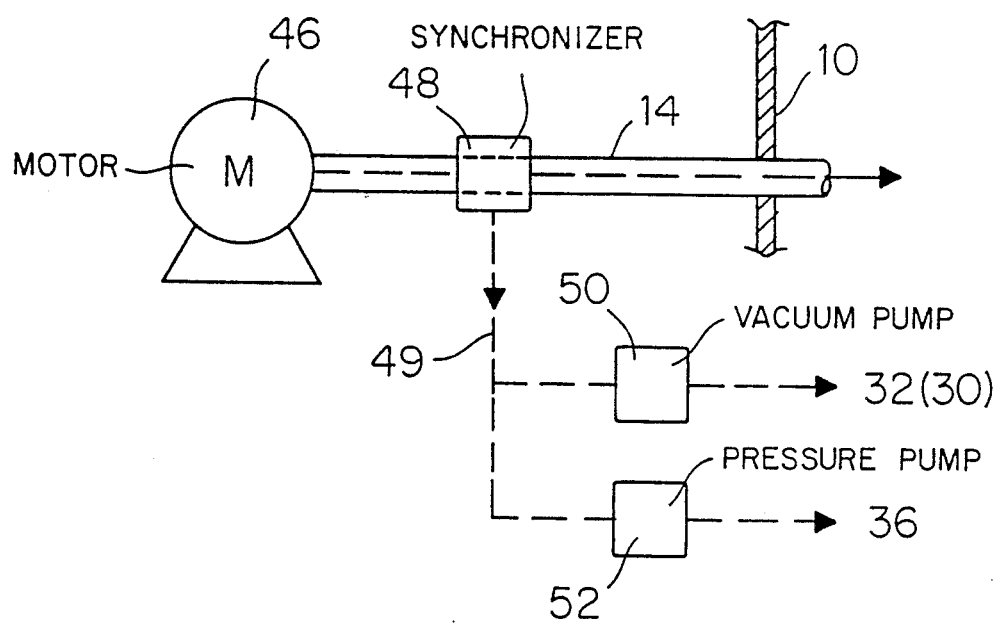
FIG. 3 is a schematic diagram of the circuitry employed for operating and synchronizing the disk-type decker.

The embodiment illustrated in FIG. 4 differs from those illustrated in FIG. 1 or FIGS. 1 through 3 (with reference otherwise to the foregoing) only in the points that will now be described.

Filtrate outlet 28 is, as in the previously described embodiments, divided into two sections 281 (for primary or turbid filtrate) and 282 (for clarified filtrate) for example by a partition 34 that can preferably be displaced along the circumference by adjustment 35. These sections communicate for purposes of evacuation with risers 54 and 56 that are long enough (e.g 5–8 m) and slender enough to prevent the flow of liquid that generates the vacuum from breaking down. These risers engage immersion vats 58 and 60 that are full of filtrate and from which the filtrate overflows into reservoirs 62 and 64 (provided with outlets). This manner of generating a vacuum is especially simple (because it involves no pumps). Even when operation has been interrupted, the vacuum will become reestablished automatically once the column of liquid in risers 54 and 56 has become built up.

The circumferential length or angle that affects the outlet of each pair of outlet sections 281 and 282 can be adjusted for either primary filtrate or clarified filtrate.

The partition 34 can be shifted across or along the circumference of the decker.

The filtrate outlet 28 or at least one of its outlet sections 281 and 282 communicates with a riser 54 or 56 that opens into an immersion vat 58 or 60 which is long enough to ensure the desired suction, and that has a flow cross-section that both insures a sufficient flow and prevents the flow from breaking down.

Several valve-activated sections 281 and 282 may be provided in the filtrate outlet 28.

Furthermore, tub 12 has a superclarified-filtrate 66 (which may also be present in the embodiment illustrated in FIG. 1) at approximately the level of shaft 14 at the outlet end that even cleaner clarified filtrate can flow out of through an outlet pipe 68.

The circumferential angle α of filtrate-chamber sections 20 should not exceed approximately 60° and is approximately 45° in the illustration (so that the circumferential angle of the filtrate outlet 28 as a whole will not exceed 180° − 2α, and accordingly 60° or 90°, when suspension level 26 is at shaft 14). This measure ensures long-lasting and effective drainage per revolution and satisfactory filtrate separation.

Figure 4:
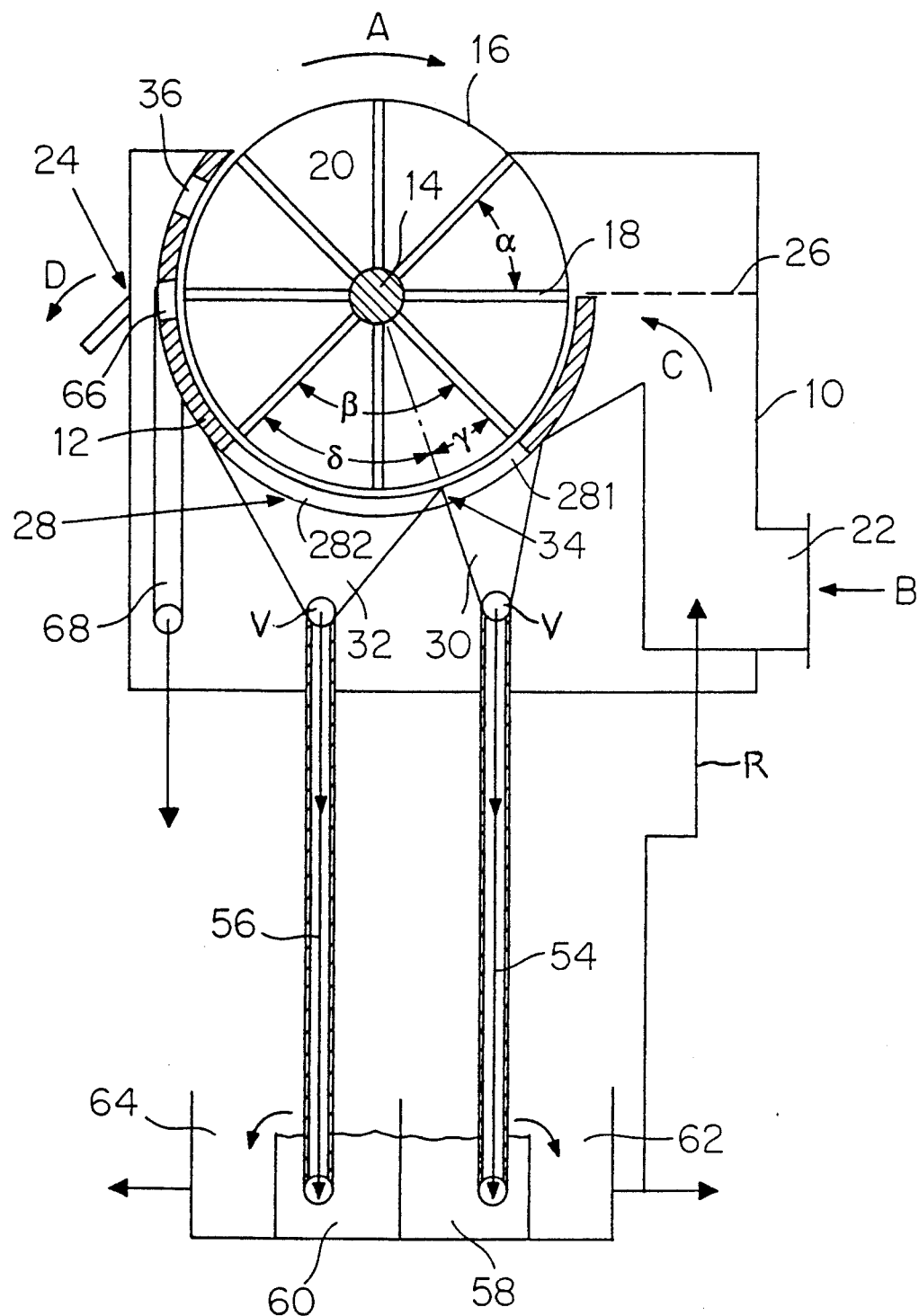
FIG. 4 is a schematic section through another embodiment of a disk-type decker.

The angles β, γ and δ shown in FIGS. 1 and 4 relate the limits of sections 281 and 282 with respect to the movable wall 34.

The circumferential angle of each filtrate-chamber section 20 may be dimensioned in relation to the overall circumferential angle of the filtrate outlet 28 to insure that each filtrate chamber is positioned completely below the suspension level 26 upstream of the entry into and upstream of the exit from the filtrate outlet.

The overall circumferential angle of the filtrate outlet 28 may be as obtuse as possible.

The circumferential angle of the outlet section 281 for primary or turbid filtrate is more acute than that of the outlet section 282 for clarified filtrate.

The number of filtrate-chamber sections 20 may be from 12 to 24. The primary or turbid filtrate may be recirculated from its associated outlet sections 281 into the suspension chambers 38.

Scrapers N may be provided to clean the screen disk after emergence out of the suspension.

I claim:

1. A disk-type decker comprising: a stationary tub; at least one screen disk mounted in said stationary tub; a horizontal driven shaft, said screen disk being rotatable on said drive shaft for draining a suspension of fibers; at least one suspension chamber opening into said tub; at least one filtrate chamber opening into said tub and adjacent to said suspension chamber; said disk being sealed off at its circumference from the tub and separating said suspension chamber from said filtrate chamber; said suspension chamber having a suspension intake at a first end of said tub, said suspension chamber having a suspension outlet at a second end of said tub; said filtrate chamber having a filtrate outlet in bottom of said tub; said filtrate chamber being divided into a plurality of sections; transverse partitions secured to said driven shaft and sealed off from said tub, said plurality of sections being distributed along the circumference of said screen disk and being mutually sealed off at least below a level of said suspension by said transverse partitions; and a source of vacuum communicating with said filtrate outlet.

2. A disk-type decker as defined in claim 1, wherein at least six transverse partitions are distributed along the circumference of each filtrate chamber.

3. A disk-type chamber as defined in claim 2, wherein said transverse partitions are distributed uniformly along said circumference.

4. A disk-type decker as defined in claim 1, wherein said transverse partitions extend radially and axially in relation to said driven shaft.

5. A disk-type decker as defined in claim 1, wherein said transverse partitions comprise flat partitions.

6. A disk-type decker as defined in claim 1, wherein said transverse partitions have radially outward edges; sealing strips secured to said radially outward edges of said transverse partitions and having an axial length; said transverse partitions extending over said axial length and being sealed off from said tub.

7. A disk-type decker as defined in claim 6, wherein said radially outward edges of said transverse partitions are separated from said tub by a narrow gap.

8. A disk-type decker as defined in claim 1, including means for pulsing said source of vacuum in relation to angular positions of said driven shaft for evacuating at least one filtrate-chamber section below said level of said suspension and in communication with said filtrate outlet.

9. A disk-type decker as defined in claim 1, wherein said source of vacuum is operated continuously for evacuating said filtrate-chamber sections below said level of said suspension and in communication with said filtrate outlet.

10. A disk-type decker as defined in claim 1, wherein said decker has a circumference, said filtrate outlet extending along said circumference of said decker.

11. A disk-type decker as defined in claim 10, wherein said filtrate outlet is divided into a plurality of sections along said circumference of said decker.

12. A disk-type decker as defined in claim 11, including means for recirculating turbid filtrate from one of said sections of said filtrate outlet into said suspension chambers.

13. A disk-type decker as defined in claim 11, wherein one section of said filtrate outlet corresponds to turbid filtrate and another said section corresponds to clarified filtrate, said section for turbid filtrate having a first circumferential angle and said section for clarified filtrate having a second circumferential angle, said second circumferential angle being greater than said first circumferential angle.

14. A disk-type decker as defined in claim 1, wherein said filtrate outlet has a plurality of valve-activated sections.

15. A disk-type decker as defined in claim 1, wherein said tub has an outlet for superclarified filtrate at an end where said suspension flows out and in vicinity of each filtrate chamber and substantially at the same level as said driven shaft.

16. A disk-type decker as defined in claim 1, wherein said sections of said filtrate chamber have a number from 12 to 24 sections.

17. A disk-type decker as defined in claim 1, including peripheral sealing lips secured to sides of screen disks bordering said suspension chambers for sealing off said screen disks from said tub.

18. A disk-type decker as defined in claim 1, including means for cleaning said screen disk after emergance out of said suspension and comprising: scraper means engaging and cleaning a suspension side of said screen disk; spray nozzles cleaning said screen disk with jets of liquid and applying blasts of pressure to a filtrate side of said screen disk.

19. A disk-type decker as defined in claim 18, including means for applying pulsed pressure positioned on a side of said screen disk for applying pulsed pressure.

20. A disk-type decker as defined in claim 19, wherein said tub has a suspension outlet end projecting up in vicinity of said filtrate chamber, said suspension outlet end having pressure-blast connections communicating with said suspension outlet end of said tub, said pressure blast connections communicating with said means for applying pulsed pressure.

21. A disk-type decker as defined in claim 1, wherein said at least one screen disk comprises pairs of screen disks, said transverse partitions extending between said driven shaft and each pair of screen disks.

22. A disk-type decker as defined in claim 1, including an immersion vat; a riser opening into said immersion vat and communicating with said filtrate outlet; said riser having a predetermined length for producing predetermined suction in said sections of said filtrate chamber and having a flow cross-section to provide predetermined filtrate flow.

23. A disk-type decker as defined in claim 1, wherein each section of said filtrate chamber has a circumferential angle dependent on the overall circumferential angle of said filtrate outlet so that each filtrate chamber is positioned completely below said suspension level before and after reaching said filtrate outlet.

24. A disk-type decker as defined in claim 1, wherein said overall circumferential angle of said filtrate outlet is a maximum obtuse angle.

25. A disk-type decker comprising: a stationary tub; at least one screen disk mounted in said stationary tub; a horizontal driven shaft, said screen disk being rotatable on said drive shaft for draining a suspension of fibers; at least one suspension chamber opening into said tub; at least one filtrate chamber opening into said tub and adjacent to said suspension chamber; said disk being sealed off at its circumference from the tub and separating said suspension chamber from said filtrate chamber; said suspension chamber having a suspension intake at a first end of said tub, said suspension chamber having a suspension outlet at a second end of said tub; said filtrate chamber having a filtrate outlet in bottom of said tub; said filtrate chamber being divided into a plurality of sections; transverse partitions secured to said driven shaft and sealed off from said tub, said plurality of sections being distributed along the circumference of said screen disk and being mutually sealed off at least below a level of said suspension by said transverse partitions; a source of vacuum communicating with said filtrate outlet; and a plurality of collecting lines for collecting filtrate that is to be removed and communicating with different sections of said filtrate outlet.

26. A disk-type decker as defined in claim 25, wherein said source of vacuum comprises at least one source of vacuum, said lines for collecting filtrate communicating with at least one source of vacuum.

27. A disk-type decker as defined in claim 25, wherein said at least one filtrate chamber comprises a plurality of axially distributed filtrate chambers having filtrate outlets with uniformly circumferentially distributed sections and said lines for collecting filtrate communicate with said uniformly circumferentially distributed sections.

28. A disk-type decker as defined in claim 25, including partition means for dividing said lines for collecting the filtrate, said partition means extending along the decker into said sections of said filtrate outlet for clarified filtrate and unclarified filtrate.

29. A disk-type decker as defined in claim 28, wherein said partition means is shiftable across or along the circumference of said decker.

30. A disk-type decker as defined in claim 25, wherein one of said lines for collecting filtrate corresponds to collecting clarified filtrate and said line for collecting clarified filtrate is the only line that is evacuated.

31. A disk-type decker comprising: a stationary tub; at least one screen disk mounted in said stationary tub; a horizontal driven shaft, said screen disk being rotatable on said drive shaft for draining a suspension of fibers; at least one suspension chamber opening into said tub; at least one filtrate chamber opening into said tub and adjacent to said suspension chamber; said disk being sealed off at its circumference from the tub and separating said suspension chamber from said filtrate chamber; said suspension chamber having a suspension intake at a first end of said tub, said suspension chamber having a suspension outlet at a second end of said tub; said filtrate chamber having a filtrate outlet in bottom of said tub; said filtrate chamber being divided into a plurality of sections; transverse partitions secured to said driven shaft and sealed off from said tub, said plurality of sections being distributed along the circumference of said screen disk and being mutually sealed off at least below a level of said suspension by said transverse partitions; a source of vacuum communicating with said filtrate outlet; transverse partitions extending between said driven shaft and each pair of screen disks; said transverse partitions extending radially and axially in relation to said driven shaft; said transverse partitions having radially outward edges; sealing strips secured to said radially outward edges of said transverse partitions and extending over the axial length of said sealing strips and sealed off from said tub; said radially outward edges of said transverse partitions and said tub having a narrow gap therebetween; means for pulsing said source of vacuum and synchronizing said source of vacuum with angular positions of said driven shaft, said source of vacuum evacuating always at least one filtrate chamber section below said level of said suspension and in communication with said filtrate outlet; said filtrate outlet extending along the circumference of said decker; said filtrate outlet being divided into a plurality of sections along the circumference of said decker; a plurality of collecting blinds for collecting filtrate to be removed and communicating with different sections of said filtrate outlet; at least one of said collecting lines communicating with said source of vacuum; said filtrate chambers being axially distributed and said sections of said filtrate outlet being uniformly circumferentially distributed, each of said collecting lines communicating with said uniformly circumferentially distributed sections.

* * * * *